Jan. 11, 1938.  H. YSSKIN  2,104,920
COUPLING
Filed Feb. 14, 1935
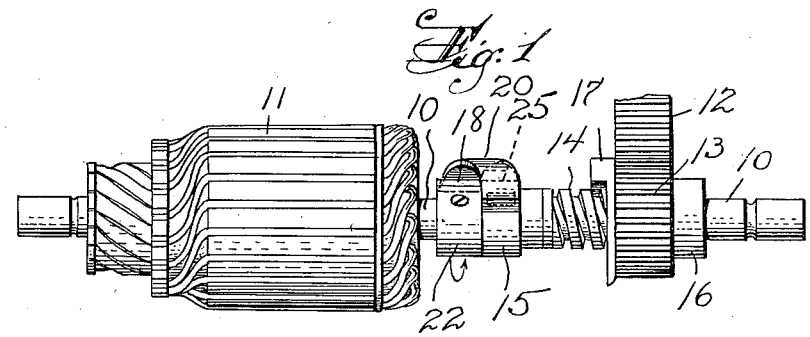
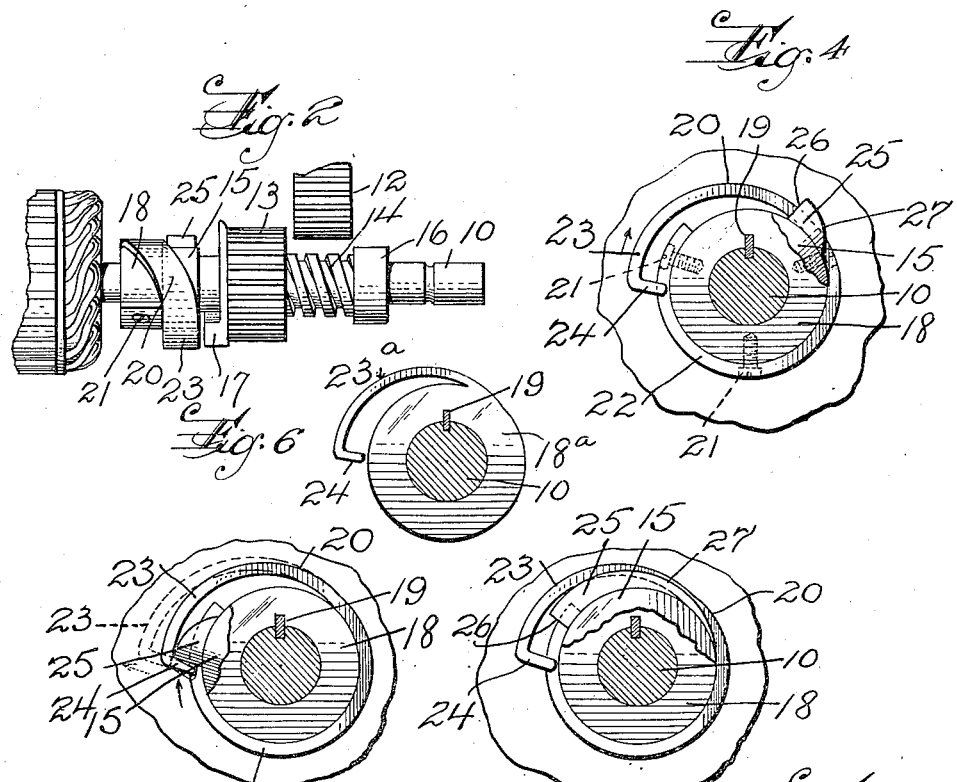
INVENTOR
Herman Ysskin,
BY
Wm H Caufield.
ATTORNEY Patented Jan. 11, 1938

2,104,920

UNITED STATES PATENT OFFICE 2,104,920

COUPLING

Herman Ysskin, Newark, N. J.

Application February 14, 1935, Serial No. 6,506

3 Claims. (Cl. 64—29)

This invention relates to an improved coupling adapted to separate under strains in excess of normal operation.

The coupling is adapted for use in connection with various forms of mechanism but is particularly adapted for use in starters for internal combustion engines. The present form of starter employs a spring that takes up all excess strain and it is a common repair in automobiles to replace the spring in the starter. This is expensive and annoying as the parts are enclosed and the spring can not be replaced readily.

In the present form the chance of breakage of the spring is minimized as the coupling separates under excess strain and the parts then return to normal engagement after the strain is overcome.

The invention is illustrated in the accompanying drawing in which Figure 1 is a side view of part of an engine starter showing my improved coupling, the starter being in mesh with a gear on the engine. Figure 2 is a top view with the starter disengaged from the engine. Figure 3 is a detail end view of the coupling with one member broken away. Figure 4 is a similar view with the two members disconnected. Figure 5 is a detail view of a modified form of projection on one member. Figure 6 is a detail view of a modified form of spring member.

The drawing, in order to fully illustrate the operation of the coupling shows the starter shaft 10 fixed to the armature 11 of the motor of the starter. The gear on the engine is indicated at 12. The pinion 13 moves longitudinally on the screw 14 of a member 15 which member is loose to rotate on the shaft 10. The member 15 includes the end stop 16 and is, as far as described the usual mechanism employed in starters of this type. I show the conventional weight 17 on the pinion 13 to hold the pinion against rotation until it engages the gear 12.

The member 18 is fixed to rotate with the shaft 10, the key 19 being illustrated as the holding means. The member 18 has secured thereto a helical spring 20. The spring 20 is relatively stiff and is securely fastened to the member 18, as by the screws 21. The spring is mounted to prevent any side tilting and I therefore prefer a wide flat spring embracing at least half of the member 18 as shown at 22. The spring has a projecting helical part 23 with a hook 24 at its free end. The projecting part of the spring extends approximately a half-turn to give it the required stiffness and prevent tilting or slewing.

The member 15 abuts on the member 18 and is provided with a projection 25 in the path of the hook 24. The projection is preferably provided with a flat face 26 for engagement with the hook 24 and on its reverse face with the curved surface 27 which surface prevents the spring snapping back into place thus preventing noise and reducing sharp strain on the spring.

The modification in Figure 5 shows a projection or tooth in which the curved face 27 has a large radius which provides for a more gradual return of the spring 23 to normal position after it has been sprung by excess strain.

Figure 6 shows a modified form of spring in which the projecting part at 23ª is made integral with the boss 18ª which boss is keyed directly to the shaft 10.

The operation of the device is as follows: The motor armature 11 rotates the shaft 10 and with it the member 18. The hook 24 engages the projection 25 on the member 15 and the screw 14 forces the pinion 13 along the screw to engage the gear 12. In case excess strain is encountered for any reason the end 24 of the spring 23 will pass over the projection 25 and engage it again on the next revolution. This construction insures long life for the spring and in case of breakage the replacement by a new spring is relatively cheap and easy.

I claim:—

1. A coupling comprising a shaft having a member fixed to rotate when the shaft rotates, said member including a helical spring extending around the outside of the shaft, said spring having an inwardly extending hook on its free end, and a member arranged loosely on the shaft and having a projection to lie normally under the hook the hook being freely flexible only in an outward radial direction.

2. A coupling comprising a shaft having a member fixed to rotate when the shaft rotates, said member including a helical spring extending around the outside of the shaft, said spring having an inwardly extending hook on its free end, and a member arranged loosely on the shaft and having a projection to lie normally under the hook, the spring being of flat strip material and having its projecting part extending approximately a half turn whereby the hook has operative flexibility only in a radial direction.

3. A coupling comprising a shaft having a member fixed to rotate when the shaft rotates, said member including a flat helical spring extending around the outside of the shaft, said spring having a hook on its free end, and a member arranged loosely on the shaft and having a projection to lie normally under the hook, the spring being of flat strip material and having its projecting part extending approximately a half turn, the projection on the loosely arranged member having a flat face to engage the hook and an eccentrically arranged curved surface in rear thereof.

HERMAN YSSKIN.